(12) United States Patent
Jiang et al.

(10) Patent No.: US 9,110,524 B1
(45) Date of Patent: Aug. 18, 2015

(54) HIGH THROUGHPUT FINITE STATE MACHINE

(71) Applicant: Xilinx, Inc., San Jose, CA (US)

(72) Inventors: Weirong Jiang, San Jose, CA (US); Gordon J. Brebner, Wrightington (GB); Yi-Hua Yang, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/299,736

(22) Filed: Jun. 9, 2014

(51) Int. Cl.
*H03K 19/173* (2006.01)
*G06F 1/04* (2006.01)
*G05B 19/045* (2006.01)

(52) U.S. Cl.
CPC ............... *G06F 1/04* (2013.01); *G05B 19/045* (2013.01)

(58) Field of Classification Search
CPC .......... G06F 2207/5063; G06F 9/3867; G06F 9/3869; G05B 19/045; G05B 2219/23289
USPC ................................. 326/46, 37, 40
See application file for complete search history.

(56) References Cited

U.S. PATENT DOCUMENTS

| | | | | |
|---|---|---|---|---|
| 4,675,556 A | * | 6/1987 | Bazes | 326/46 |
| 5,774,370 A | * | 6/1998 | Giomi | 716/105 |
| 6,182,268 B1 | * | 1/2001 | McElvain | 716/104 |
| 6,421,815 B1 | * | 7/2002 | Seawright | 716/105 |
| 7,061,272 B2 | * | 6/2006 | Wilkes et al. | 326/46 |
| 7,739,625 B2 | * | 6/2010 | Nieh et al. | 716/103 |

OTHER PUBLICATIONS

Lin, Horng-Dar et al., "Finite State Machine Has Unlimited Concurrency," *IEEE Transactions on Circuits and Systems*, May 1991, pp. 465-475, IEEE, Piscataway, New Jersey, USA.
Savage, John E., *Models of Computation: Exploring the Power of Computing*, 1998, Chapter 3, pp. 91-152, Addison-Wesley Publishing, Boston, Massachusetts, USA.

* cited by examiner

*Primary Examiner* — Vibol Tan
(74) *Attorney, Agent, or Firm* — W. Eric Webostad

(57) ABSTRACT

In an FSM circuit, look-ahead-cascade modules are coupled to receive possible states and corresponding subsets of data inputs. Merge modules are coupled to a second-to-the-lowest to highest order of the look-ahead-cascade modules. The second-to-the-lowest to highest order of disambiguation modules are coupled to at least a portion of the merge modules. The lowest order of the disambiguation modules is coupled to the lowest order of the look-ahead-cascade modules. The lowest-to-highest order of the disambiguation modules are coupled to receive respective sets of interim states of rN states each to select respective sets of next states of r states each. A state register is coupled to receive a portion of the highest order of the sets of next states to provide a select signal. Each of the disambiguation modules is coupled to receive the select signal for selection of the sets of next states of the r states each.

20 Claims, 14 Drawing Sheets

```
// FSM with N states Sigma[N] and transition function Delta
// Run FSM for m transitions, where m = (2^i)r for some integer i>=0
// Start state is s0
// Returns sequence of m states following transitions on the input symbols in D
// Run time: lg(m/r)+r steps
// Hardware: (m/r) DM, (m lg(m/r) / 2r) MM, (m/r) L+C
state[m] runFSM(state s0, int m, symbol D[m]) {
    state history[m,N], result[m];
    history = doSteps(Sigma, m, D);          1201
                                     1202
    par for (int i = 0; i < m; i++)
        result[i] = history[i,(int)s0)]  // Hardware module: DM
                                      1203
    return result;
}
```

FIG. 12-1

```
// Run FSM for n transitions using divide-and-conquer approach
// Run time: lg(n/r)+r steps
// Hardware: (n lg(n/r) / 2r) MM, (n/r) L+C
state[n,N] doSteps(state vector[N], int n, symbol D[n]) {
  if (n == r)
    return doBaseSteps(vector, D); // Time r steps
  else {
    state history1[n/2,N], history2[n/2,N], history[n,N];
    par {
      history1 = doSteps(vector, n/2, D[0:n/2-1]); // HW: wire
      history2 = doSteps(vector, n/2, D[n/2:n-1]); // HW: wire
    }
    par { // Time 1 step
      par for (int i = 0; i < n/2; i++)
        par for (int j = 0; j < N; j++) // HW: wire
          history[i,j] = history1[i,j];
      par for (int i = n/2; i < n; i++)
        par for (int j = 0; j < N; j++) // HW: MM
          history[i,j] = history2[i, (int)history1[n/2-1,j]];
    }
    return history;
  }
}
```

FIG. 12-2

```
// Run FSM for r transitions
// Run time: r steps
// Hardware: 1 L+C
state[r,N] doBaseSteps(state vector[N], symbol D[r]) { // HW: L+C
    state history[r,N];
    for (int i = 0; i < r; i++) // Time r steps
        par for (int j = 0; j < N; j++) // Time 1 step
            history[i,j] = Delta(i==0?vector[j]:history[i-1,j], D[i]);
    return history;
}
```

FIG. 12-3

HIGH THROUGHPUT FINITE STATE MACHINE

TECHNICAL FIELD

The following description relates to integrated circuit devices ("ICs"). More particularly, the following description relates to a high-throughput finite state machine for an IC.

BACKGROUND

Various encoders, decoders, and other circuits use finite state machines ("FSMs"). Generally, an FSM makes a state transition sequentially for each data item input. For example, for a 64B/66B encoder/decoder in an Ethernet Physical Coding Sublayer ("PCS"), a state transition is made for every 64-bit data block. For high throughput, wide data buses, such as for example 1280 bits (i.e., 20 64-bit data blocks), are used to process a large amount of data per clock cycle at high clock rate. In the past, this involved cascading multiple copies of the same FSM circuit so as to process multiple data blocks per clock cycle. However, the length of the critical path for state propagation is generally linearly increased, which offsets negatively the throughput increase in such cascaded FSM circuits. Accordingly, it has been problematic to meet a timing requirement in a 400 Gb/s PCS with a clock rate above 300 MHz.

Hence, it is desirable and useful to provide an FSM circuit that facilitates high data rates for meeting or exceeding high throughput of high-speed applications.

SUMMARY

An apparatus relates generally to a finite state machine circuit. In such an apparatus, look-ahead-cascade modules are coupled to receive possible states of the finite state machine circuit and coupled to receive data inputs, where the possible states include possible states $P_0$ through $P_{N-1}$ for N a positive integer greater than one, N representing a number of states in the finite state machine circuit. The look-ahead-cascade modules are coupled to receive corresponding subsets of the data inputs. Merge modules are coupled to a second-to-the-lowest order to the highest order of the look-ahead-cascade modules. A second-to-the-lowest order to the highest order of disambiguation modules are coupled to at least a portion of the merge modules. The lowest order of the disambiguation modules is coupled to the lowest order of the look-ahead-cascade modules. The lowest order to the highest order of the disambiguation modules are coupled to receive respective sets of interim states of rN states each to select respective sets of next states of r states each for r a positive integer greater than one. A state register is coupled to receive a portion of the highest order of the sets of next states for registration to provide a select signal, where each of the disambiguation modules is coupled to receive the select signal for selection of the sets of next states of the r states each.

A method relates generally to providing a finite state machine circuit. In such a method, a set of possible states and a set of data inputs are obtained for generation of look-ahead-cascade modules. The look-ahead modules are generated coupled to receive corresponding subsets of the set of data inputs and each is coupled to receive the set of possible states to provide first rN states from each of the look-ahead-cascade modules for r and N positive integers greater than one. The set of possible states includes possible states $P_0$ through $P_{N-1}$. A pipelined tree is generated coupled to receive the first rN states from each of the look-ahead-cascade modules to provide corresponding second rN states. Disambiguation modules are generated coupled to the pipelined tree to receive the second rN states corresponding thereto to provide r states from each of the disambiguation modules. Each of the disambiguation modules is coupled to provide the r states therefrom from the second rN states corresponding thereto. A state register is generated coupled to receive a portion of the r states of the highest order of the disambiguation modules for registration thereof to provide a select signal. Each of the disambiguation modules is coupled to receive the select signal to select the r states for output corresponding thereto.

A method relates generally to operating a finite state machine. In such a method, a set of possible states is obtained by each look-ahead-cascade module of a parallelization of look-ahead-cascade modules. Non-overlapping subsets of data of a set of data are respectively received by the look-ahead-cascade modules from the lowest order to the highest order of the subsets of data. A first plurality of rN states, for r and N positive integers greater than one, is generated by each of the look-ahead-cascade modules from the subsets of data corresponding to the look-ahead-cascade modules for the set of possible states. The set of possible states includes possible states $P_0$ through $P_{N-1}$. The first plurality of rN states from each of the look-ahead-cascade modules are input to a pipelined tree coupled to receive the first plurality of rN states from each of the look-ahead-cascade modules to merge states to provide a second plurality of rN states from the pipelined tree. The second plurality of rN states from the pipelined tree are input to disambiguation modules from the lowest order to the highest order of the second plurality of rN states to provide r states from each of the disambiguation modules. A portion of the r states of the highest order of the disambiguation modules is received for registration in a state register to provide a select signal therefrom. The select signal is provided to each of the disambiguation modules to select the r states for output of each of the r states corresponding thereto.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 12-1 through 12-3 is a listing diagram depicting an exemplary FSM configuration flow for the FSM architecture of FIG. 1.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

As described below in additional detail, a scalable finite state machine ("FSM") parallelization with divided and concurrent processing may be used for high data rates, such as from 400 Gb/s upwards, using a wide, though divided out, data bus with a large input width, such as 1000-bits and beyond, for clock rates of 300 MHz and beyond. Such an FSM architecture may be used with a small-to-moderate number of states, which is common in many various encoders, decoders, and other applications. For example, a 400 Gb/s PCS 64b/66b encoder or decoder may be implemented using an FSM circuit as described below herein with an input data bus width of 1280 bits for 20 blocks of 64 bit data per clock cycle processing for a clock rate of at least 300 MHz. For an IEEE 802.3 specification, the FSM of PCS 64b/66b encoder or decoder contains five states for one transition per 64-bit block. This is just one example application, and there are many other applications that may use an FSM circuit as described herein. Furthermore, because an FSM architecture as described herein is modular and configurable, various resource-performance trade-offs may be used to adapt to an application for implementation of an FSM circuit.

With the above general understanding borne in mind, various configurations for FSM architectures are generally described below.

Figure 1:
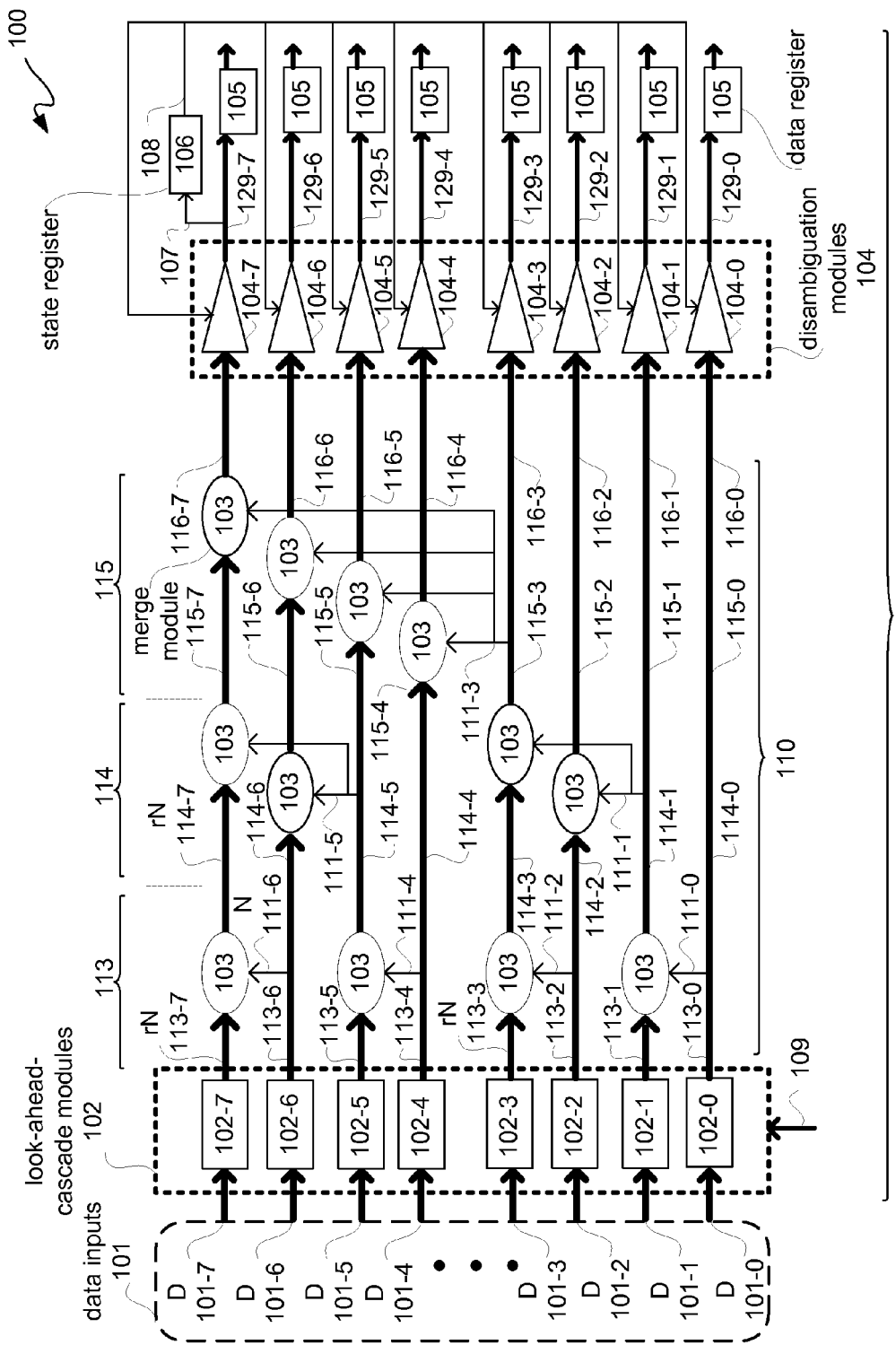
FIG. 1 is a block diagram depicting an exemplary finite state machine ("FSM") architecture with a binary merger.

FIG. 1 is a block diagram depicting an exemplary finite state machine ("FSM") architecture 100 with a binary merger. FSM architecture or FSM circuit 100 may have a latency associated with $O(r+\log_2(m/r))$ and a resource usage associated with $O(m \log 2(m/r))$, where m and r are positive integers greater than one and where "O" is for what is known as a "Big O" notation in mathematics. FSM architecture 100 may be implemented in an FSM circuit, as described below in additional detail. In the following description, m is a number of data inputs. Look-ahead results for data inputs $D_i, D_{i+1}, \ldots, D_{j-1}, D_j$ may be denoted by L(i,j). For a single-clock cycle 150 combining function f, look-ahead results for m data inputs may be expressed for example as $L(0, m-1)=f(L(0,(m/2)-1), L(m/2, m-1))$. Thus, all of FSM architecture 100 may be in a single clock domain 150, namely all registers of FSM architecture 100 may be clocked with a same clock signal 150.

Along the above lines, FSM architecture 100 includes look-ahead-cascade modules 102 coupled to receive possible states, such as a set of possible states 109 and data or a set of data inputs or data 101. The set of possible states, which may be initial states, may include possible states $P_0$ through $P_{N-1}$ for N a positive integer greater than one. Possible states 109 may be the same for all of subsets of data 101. Data 101 may be subdivided into non-overlapping subsets. Possible states $P_0$ through $P_{N-1}$ may be respective constants. In this example, there are eight subsets of data 101, namely subsets D 101-0 through D 101-7. There may be fewer or more subsets of data in other implementations.

For a data bus consisting of m data items each of which is w bits, data 101 may be designated as $D_0$ through $D_{m-1}$, where the width of Di (i=0, 1, ..., m−1) is w bits. Such subsets D 101-0 through D 101-7 therefore may correspond to groupings of sequential bits of data. Look-ahead-cascade modules 102-0 through 102-7 are coupled to receive corresponding subsets D 101-0 through D 101-7 of data. For example, a subset of data $D_{m-r}$ through $D_{m-1}$ may be provided to the highest order look-ahead-cascade module 102, which in this example is look-ahead-cascade module 102-7. The lowest order look-ahead-cascade module, which in this example is look-ahead-cascade module 102-0, may be provided with a subset of data $D_0$ through $D_{r-1}$. Merge modules 103 may be respectively coupled to a second-to-the-lowest order to the highest order of look-ahead-cascade modules 102, namely look-ahead-cascade modules 102-1 through 102-7 in this example.

Along the above lines, data 101 may have a width W=m*w, for W an integer substantially greater than 100 and for m a positive integer substantially greater than 10 for example. Data 101 includes data items $D_0$ through $D_{m-1}$. The number of look-ahead-cascade modules 102 may be equal to m/r, which is equal to the number of subsets of data 101. Each of these subsets may include r data items in sequence selected from data items $D_0$ through $D_{m-1}$. Subsets of data 101 may be contiguous and non-overlapping with respect to one another.

Merge modules 103 may be coupled to form a network to merge states from multiple look-ahead-cascade modules, namely a pipelined tree 110. As described below in additional detail, a merging network, which may be pipelined tree 110, includes a number of merging nodes, which may be provided by merge modules 103. Each such merging or merge node may perform a cross-product to merge two sets of states. As described below in additional detail, a merging node may be implemented using multiple multiplexers.

In this example, pipelined tree 110 is a binary merge tree having a latency associated with $O(r+\log_2(m/r))$ and a resource usage associated with $O(m \log_2(m/r))$. More generally, merging latency for pipelined tree 110 may be O(log (m)), whereas the resource usage is O(m·log(m)), for m state transitions per cycle. Registers, as well as clock signals, for pipelined tree 110 are not illustratively depicted for purposes of clarity and not limitation. However, in this example, there may be three register or pipeline stages 113 through 115.

For pipelined tree 110 of FIG. 1, there are m/r lanes, where for each of such lanes r groups of N states each, namely rN states 113-0 through 113-7, are respectively output from look-ahead-cascade modules 102-0 through 102-7 onto such m/r lanes. For rN states 113-1 through 113-7, each set of rN states is provided to a corresponding merge module 103. For rN states 113-0 output from the lowest order look-ahead-cascade module 102-0, such states are directly coupled to the lowest order disambiguation module 104-0 of disambiguation modules 104. However, these rN states 113-0 may be pipelined through pipelined stages 113 through 115 labeled respectively as rN states 114-0, 115-0, and 116-0 for correspondence with other rN states, as described below in additional detail.

For pipeline stage 113, the highest order N states of each of rN states 113-0, 113-2, 113-4, and 113-6 are provided as selectors 111-0, 111-2, 111-4, and 111-6, respectively, to a corresponding order-adjacent nearest neighbor merge module 103 on a next level order higher than a level on which rN states 113-0, 113-2, 113-4, and 113-6 are located. Along those lines, N states 111-0, 111-2, 111-4, and 111-6 are selectors for next level higher order corresponding rN states 113-1, 113-3, 113-5, and 113-7 of respective merge modules 103 for a pipeline stage 113. From each of merge modules 103 in pipeline stage 113, corresponding rN states 114-1, 114-3, 114-5, and 114-7 are selected for output from such merge modules 103 respectively using N states 111-0, 111-2, 111-4, and 111-6, as selectors. For example, a set of rN states 113-3, which are interim states, are input to a merge module 103 of a same order or level, and the highest order N states of interim rN states 113-2 are provided to such merge module 103 as selectors to select interim rN states 114-3 which are input to a next merge module 103 of the same order or level.

In pipeline stage 114, rN states 114-0 through 114-7 are further processed for a binary or binary-like merge in pipelined tree 110. Along those lines, rN states 114-0 and 114-1 are piped through such pipeline stage 114, with the highest order N states 111-1 of rN states 114-1 being provided as selectors to a merge module 103 on a next higher order level than rN states 114-1. Pipelined rN states 114-1 may be pipelined through pipelined stages 114 and 115 labeled respectively as rN states 115-1 and 116-1 for correspondence with other rN states, as described below in additional detail.

For pipelined stage 114, rN states 114-2, 114-3, 114-6, and 114-7 are input to corresponding merge modules 103 with the highest order N states 111-1 and 111-5 respectively of rN states 114-1 and 114-5 provided as selectors. More particularly, N states 111-1 are provided to two merge modules respectively coupled to receive rN states 114-2 and 114-3 to respectively select therefrom rN states 115-2 and 115-3. There is a merge module 103 coupled to receive rN states 114-2 at a next higher order than rN states 114-1, from which N states 111-1 are obtained as selectors, and there is a merge module 103 coupled to receive rN states 114-3, to which N states 111-1 are provided, at a next higher order than rN states 114-2. Likewise, there is a merge module 103 coupled to receive rN states 114-6 at a next higher order than rN states 114-5, from which N states 111-5 are obtained as selectors, and there is a merge module 103 coupled to receive rN states 114-7, to which N states 111-5 are provided, at a next higher order than rN states 114-6. Thus, N states 111-1 and 111-5 are each provided to an order-adjacent nearest neighbor level merge module 103 and to a merge module 103 one level above such an order-adjacent nearest neighbor level merge module 103. Generally, N states 111-1 and 111-5 are provided to sets of merge modules 103. More particularly, N states 111-1 are provided one level higher to an order-adjacent nearest neighbor merge module 103 and are provided two levels higher to a merge module 103 that is not an order-adjacent nearest neighbor. Likewise, N states 111-5 are provided one level higher to an order-adjacent nearest neighbor merge module 103 and are provided two levels higher to a merge module 103 that is not an order-adjacent nearest neighbor.

For pipelined stage 115, rN states 115-0 through 115-3 may be pipelined through, with the highest order N states 111-3 obtained from rN states 115-3 being used as selectors. Along those lines, rN states 115-0 through 115-3 corresponding to the lowest to fourth order may be pipelined through pipelined stage 115 labeled respectively as rN states 116-0 through 116-3 for correspondence with other rN states, as described below in additional detail.

In pipelined stage 115, rN states 115-4 through 115-7, corresponding to a fifth to eight (highest) order are input to respective merge modules 103 on corresponding levels for selection of rN states 116-4 through 116-7, respectively, responsive to rN states 111-3. Thus, rN states 111-3 may be provided from a fourth order or level up to each of the fifth through eighth levels of pipelined tree 110.

From pipelined tree 110, interim rN states 116-0 through 116-7 from the lowest to the highest order are provided to corresponding disambiguation modules 104-0 through 104-7 of disambiguation modules 104. Thus, a second-to-the-lowest order to the highest order of disambiguation modules 104 are coupled to at least a portion of merge modules 103 of pipelined tree 110. The lowest order disambiguation module 104-0 of disambiguation modules 104 is coupled to the lowest order look-ahead-cascade module 102-0 of look-ahead-cascade modules 102 through register stages 113 through 115 of pipelined tree 110 without going through any merge module 103 of pipelined tree 110.

The lowest order to the highest order of disambiguation modules 104-0 through 104-7, respectively, are coupled to receive respective sets of interim states of rN states 116-0 through 116-7, where each of disambiguation modules 104-0 through 104-7 is to select respective sets of next states 129-0 through 129-7 of r states each. Each of next states 129-0 through 129-7 may be provided to a corresponding data register 105 for subsequent output. Data registers 105 may thus be respectively coupled to outputs of disambiguation modules 104 to receive and register the m/r sets of next states output of r states each respectively output from disambiguation modules 104-0 through 104-7.

A state register 106 may be coupled to receive the highest order state of a set of next states, namely a portion of next states 129-7 in this example, for registration of a current state select signal 107 to output from state register 106 as a next state select signal 108. Each of disambiguation modules 104-0 through 104-7 may be coupled to receive next state select signal 108 for selection of sets of next states 129-0 through 129-7 of r states each. For example, if N is equal to 8, then next state select signal 108 may be three bits wide, namely $2^3$, to select one set of r states out of rN states.

From the above-description, it should be understood that parallel state merging is used instead of conventional sequential state propagation. Thus, overall latency may be reduced, i.e., to r+log 2(m/r) for r a small constant, with no increase in critical path length as compared with a conventional FSM circuit. As described below in additional detail, look-ahead-cascade modules use a "divide-and-conquer" approach by dividing a set of data into subsets and processing each of the subsets of data in parallel. Additionally, each possible outcome is determined in parallel to provide a look-ahead result to reduce timing overhead. Along those lines, length of the critical path of an FSM architecture is reduced to O(1), namely equivalent or comparable to a conventional FSM circuit, while resources may be O(m·log(m)) and latency may be O(log(m)) for FSM architecture 100 processing m data blocks per clock cycle. FSM architecture 100 is a modular architecture, which may be used for parallelization to scale up to address an application. Such modularity and scalability may be useful in applications where an FSM circuit may be programmed according to an application, such as in an FPGA or other integrated circuit with programmable resources.

FSM architecture 100 may thus have a high throughput facilitated in part by a wide data bus with an ability to sustain a high clock rate.

Figure 2:
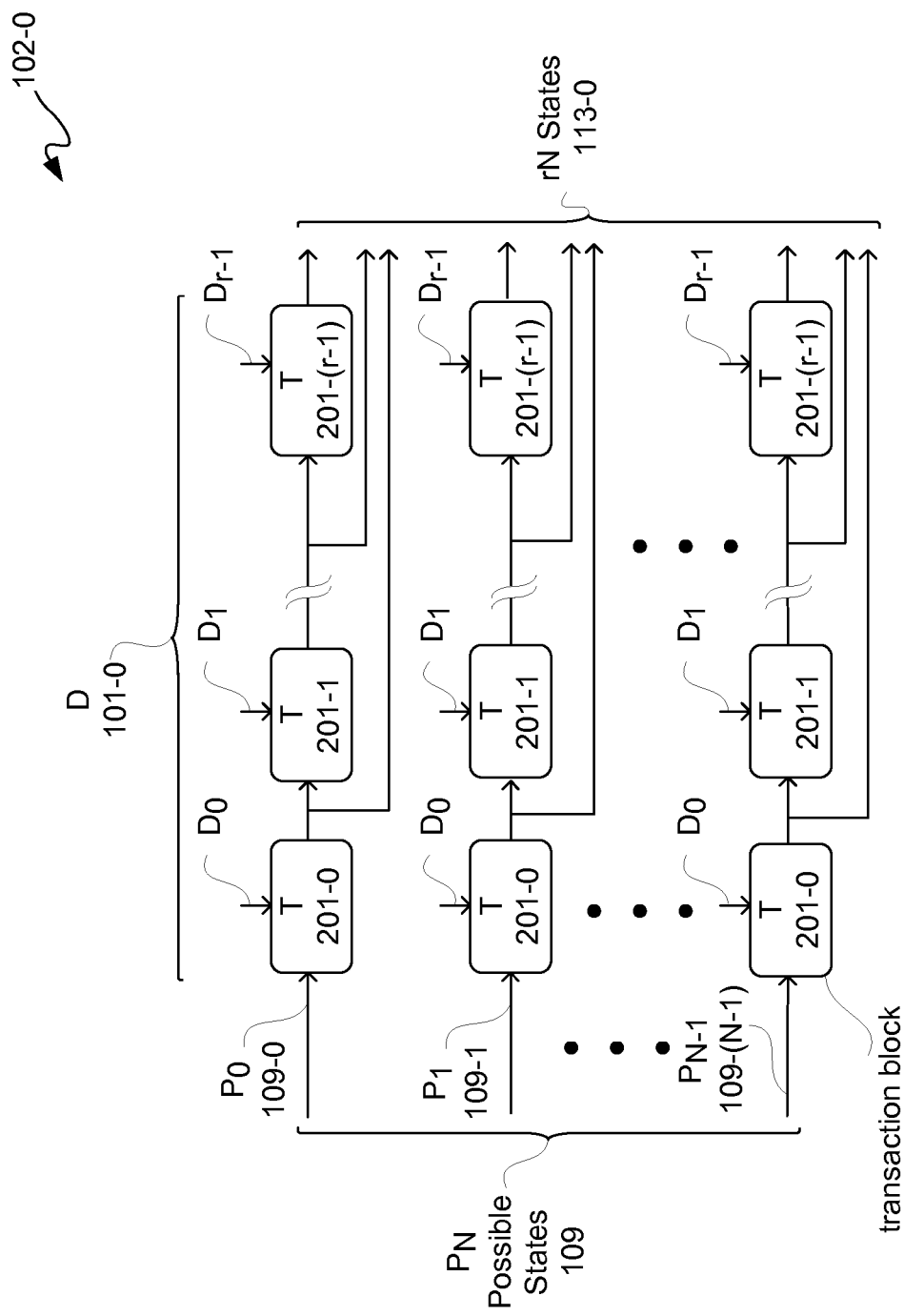
FIG. 2 is a block diagram depicting an exemplary look-ahead-cascade module for the FSM architecture of FIG. 1.

FIG. 2 is a block diagram depicting an exemplary look-ahead-cascade module 102-0 for FSM architecture 100 of FIG. 1. As each of look-ahead-cascade modules 102 has a same configuration, a look-ahead-cascade module 102-0 of FSM architecture 100 is used as an example representing each of such look-ahead-cascade modules 102, for purposes of clarity and not limitation, as only the data inputs change from one look-ahead-cascade module 102 to another look-ahead-cascade module 102.

Look-ahead-cascade module 102-0 includes N sets of transaction, T, blocks 201-0 through 201-(r−1) coupled in series for sequential and parallel processing. T blocks 201-0 through 201-(r−1) may be implemented using combinational logic, where each of T blocks 201-0 through 201-(r−1) may collectively use one clock cycle of a clock signal, not shown for purposes of clarity and not limitation.

Each of possible states 109-0 through 109-(N−1) for N possible states 109, namely possible states $P_0$ through $P_{N-1}$, are respectively provided to N×T blocks 201-0. Each series of T blocks 201-0 through 201-(r−1) are respectively coupled to receive data items $D_0$ through $D_{r-1}$ of data subset 101-0, where data items $D_0$ through $D_{r-1}$ of data subset 101-0 are respectively provided to T blocks 201-0 through 201-(r−1) for each row or series. Outputs of each of T blocks 201-0 through 201-(r−1) for each series are provided for output as rN states 113-0. Each T block 201 may thus trigger a state transition, where each such state transition may depend on a prior possible state or a prior data state transition. Thus, there are r outputs for each series and N series for a total of rN states output from look-ahead-cascade module 102-0, where a highest order of N states of such rN states output are from a series with a possible state $P_{N-1}$ input, and the lowest order of N states of such rN states output are from a series with a possible state $P_0$ input. Each rN states of a plurality of rN states 113 may be registered in registers, not illustratively depicted for purposes of clarity, before being piped into a downstream pipelined tree described below in additional detail for merging data states.

Accordingly, by dividing data into subsets of r items and processing each subset in parallel with each other subset of data less time is consumed. In other words, each chain of r T blocks is still shorter for a subset of a set of data than for the entire set of data, which facilitates processing data through a look-ahead-cascade module in a single clock cycle. Additionally, all possible combinations of such data, namely for all N possible states, may be processed in parallel to provide a look-ahead result for selection to reduce timing overhead. These reductions in timing overhead may facilitate use of a higher frequency of operation, as well as a reduction in latency. Furthermore, the highest order of N states of rN states of a lower order look-ahead-cascade module may be used to select rN states of a higher order look-ahead-cascade module, as described below in additional detail.

Figure 3:
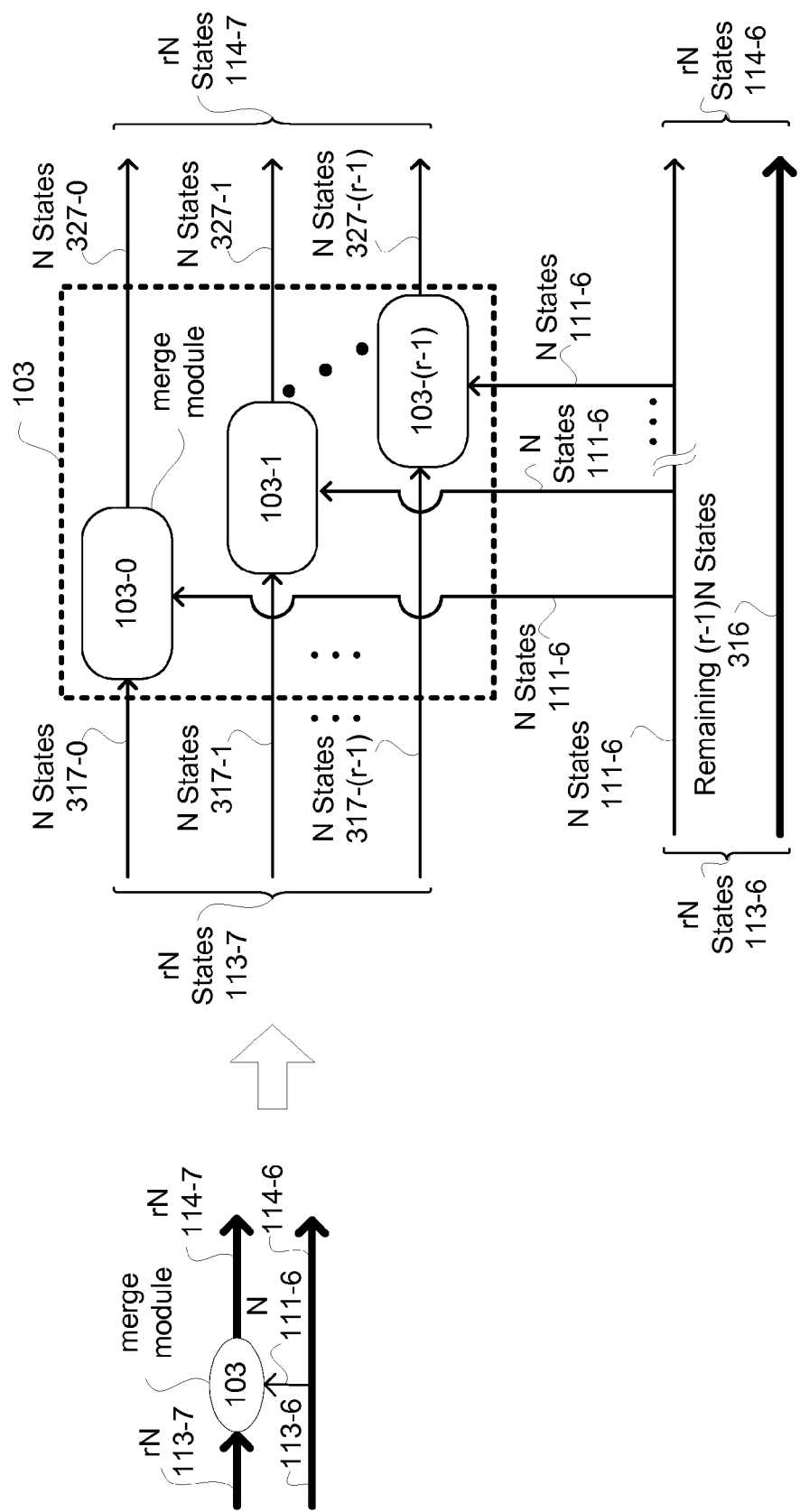
FIG. 3 is a block diagram depicting an exemplary merge module for the FSM architecture of FIG. 1.

FIG. 3 is a block diagram depicting an exemplary merge module 103 for FSM architecture 100 of FIG. 1. As each merge module 103 has a same configuration, a merge module 103 of pipelined tree 110 is described for purposes of clarity and not limitation.

Merge module 103 includes r merge blocks 103-0 through 103-(r−1). Merge blocks 103-0 through 103-(r−1) are respectively coupled to receive N states 317-0 through 317-(r−1) of rN states 113-7. N states 111-6 are provided to each of merge blocks 103-0 through 103-(r−1) as selectors, such as multiplexer control select signals for example or other control signals provided to select circuits. N states 111-6 may be the highest order of rN states 113-6. A remaining (r−1)N states 316 of rN states 113-6, as well as N states 111-6 may be pipelined forward as rN states 114-6. Merge blocks 103-0 through 103-(r−1) respectively output N states 327-0 through 327-(r−1). N states 327-0 through 327-(r−1) collectively are rN states 114-7.

Figure 4:
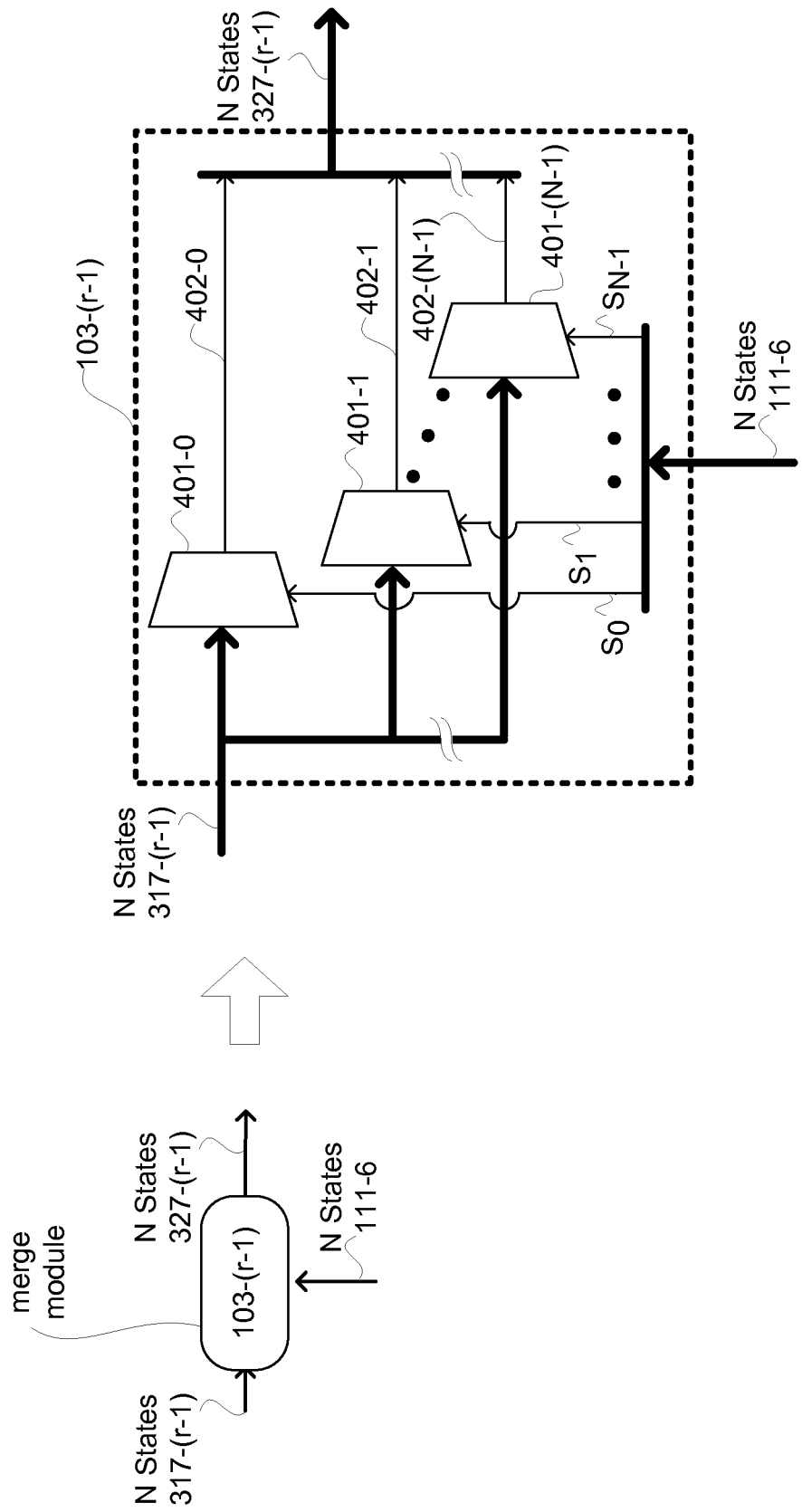
FIG. 4 is a schematic diagram depicting an exemplary merge block of the merge module of FIG. 3.

FIG. 4 is a schematic diagram depicting an exemplary merge block 103-(r−1) for merge module 103 of FIG. 3. As each merge block of merge module 103 has a same configuration, a merge block 103-(r−1) of pipelined tree 110 is described for purposes of clarity and not limitation.

Merge block 103-(r−1) is coupled to receive N states 317-(r−1) from which N states 327-(r−1) are selected using N states 111-6 as select signals. More particularly, N states 111-6 are provided as select signals $S_0$ through $S_{N-1}$ to corresponding multiplexers 401-0 through 401-(N−1) of merge block 103-(r−1) of merge module 103 of FIG. 3.

N states 317-(r−1) are input to each of multiplexers 401-0 through 401-(N−1). Select signals $S_0$ through $S_{N-1}$, from lowest to highest order, respectively provided to multiplexers 401-0 through 401-(N−1), from lowest to highest order, are used to select corresponding multiplexer outputs 402-0 through 402-(N−1) respectively from multiplexers 401-0 through 401-(N−1). Multiplexer outputs 402-0 through 402-(N−1) collectively provide N states 327-(r−1).

Figure 5:
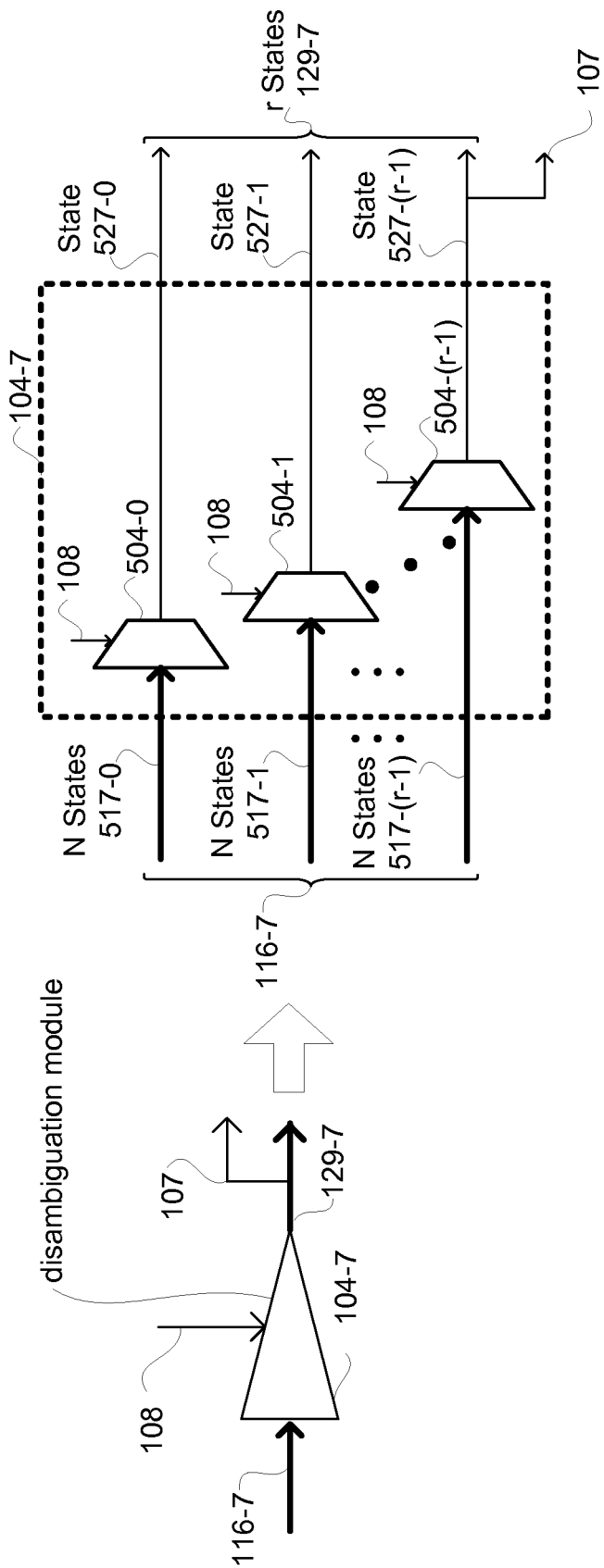
FIG. 5 is a schematic diagram depicting an exemplary disambiguation module for the FSM architecture of FIG. 1.

FIG. 5 is a schematic diagram depicting an exemplary disambiguation module 104-7 for FSM architecture 100 of FIG. 1. As each disambiguation module of FSM architecture 100 has a same configuration, a disambiguation module 104-7 is described for purposes of clarity and not limitation.

Disambiguation module 104-7 is coupled to receive rN states 116-7 to provide r states 129-7. Disambiguation module 104-7 is coupled to receive a select signal 108, which select signal 108 is provided to each of multiplexers 504-0 through 504-(r−1) of disambiguation module 104-7 as a control select signal. Each of multiplexers 504-0 through 504-(r−1) of disambiguation module 104-7 is respectively coupled to receive N states 517-0 through 517-(r−1), from lowest to highest order, to select multiplexer outputs, namely output next states 527-0 through 527-(r−1) respectively, therefrom. Multiplexer output next states 527-0 through 527-(r−1) collectively provide r states 129-7.

A highest or most significant bits portion of output next state 527-(r−1) may be used to provide a current state select signal 107 for registration as previously described. Current state select signal 107 has a size or bit width of log(N). Along those lines, each of r states 109-0 through 109-7 respectively output from each of disambiguation modules 104-0 through 104-7 has a bus width of r multiplied by log(N).

Figure 6:
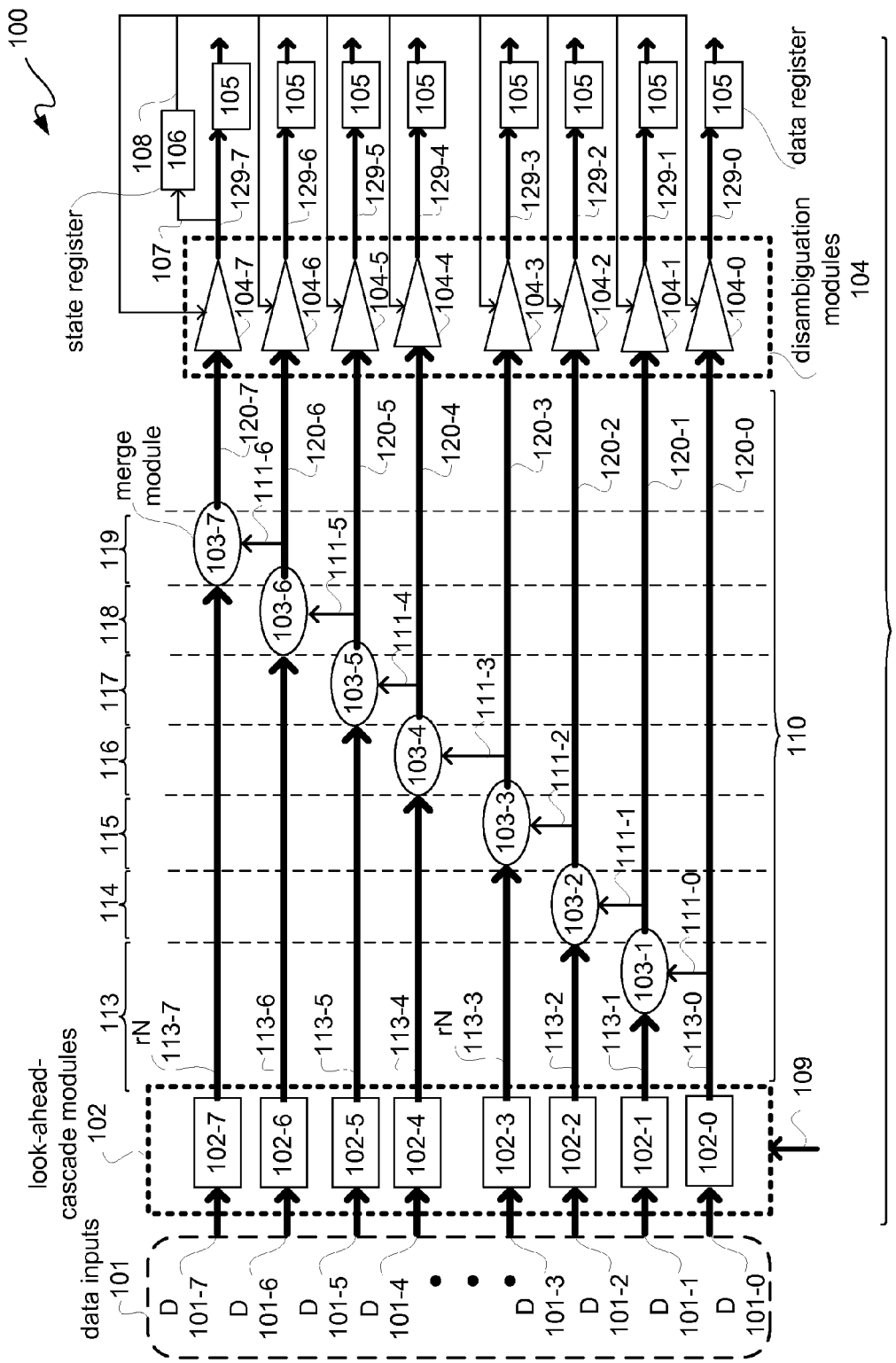
FIG. 6 is a block diagram depicting an exemplary FSM architecture with a linear merger.

FIG. 6 is a block diagram depicting an exemplary FSM architecture 100 with a linear merger. Pipelined tree 110 of FSM architecture 100 of FIG. 6 is a linear merger tree having a latency associated with O(m) and a resource usage associated with O(m) for m state transitions per cycle. As only pipelined tree 110 of FSM architecture 100 of FIG. 6 is different than that of FIG. 1, generally only pipelined tree 110 of FSM architecture 100 of FIG. 6 is described below for purposes of clarity and not limitation.

In this example, merge modules 103-1 through 103-7 may respectively be coupled between look-ahead-cascade modules 102-1 through 102-7 and corresponding disambiguation modules 104-1 through 104-7 for pipelined tree 110. Look-ahead-cascade modules 102-0 and disambiguation module 104-0 may be coupled to one another as previously described for pipelined tree 110. However, in this example of a pipelined tree 110 there may be pipelined stages 113 through 119, namely a longer latency with fewer merge modules 103 than pipelined tree 110 of FIG. 1.

N states 111-0 through 111-6 may respectively be provided in pipelined stages 113 through 119 to a nearest neighbor merge module 103 one level or order higher for respective selection of rN states. More particularly, rN states 113-1 through 113-7 are respectively input to corresponding merge modules 103-1 through 103-7 of same order for selection of rN states 120-1 through 120-7, respectively, for being pipelined out of pipeline tree 110, and rN states 113-0 are more directly pipelined out of pipeline tree 110. Such rN states 120-1 through 120-7 may effectively be selected responsive to N states 111-0 through 111-6, respectively, provided as selectors to merge modules 103-1 through 103-7 in pipeline stages 113 through 119, respectively.

Figure 7:
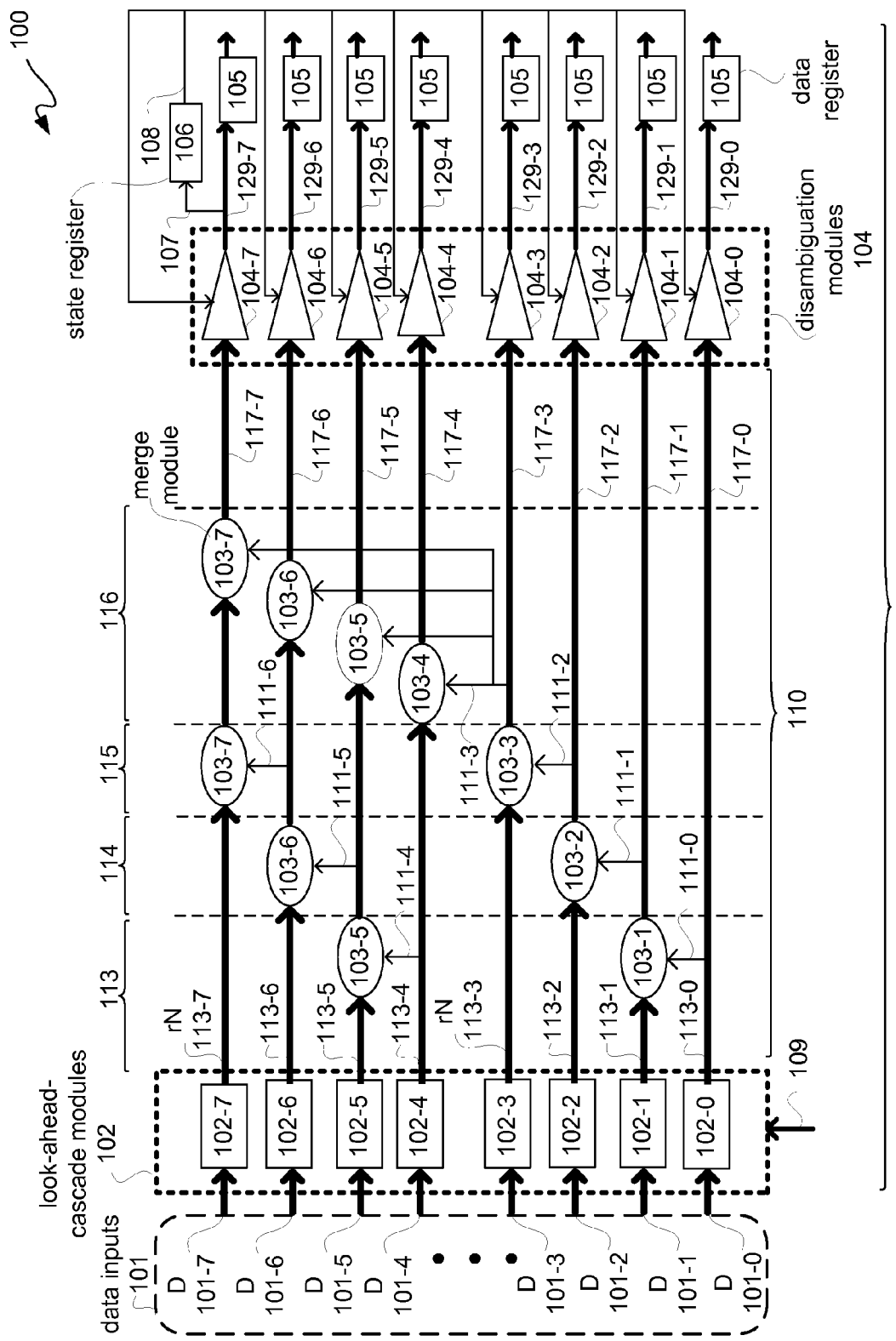
FIG. 7 is a block diagram depicting an exemplary FSM architecture with a hybrid linear-binary merger.

FIG. 7 is a block diagram depicting an exemplary FSM architecture 100 with a hybrid linear-binary merger. Pipelined tree 110 of FSM architecture 100 of FIG. 7 is a hybrid linear-binary merger tree, namely a hybrid of pipelined trees 110 of FSM architectures 100 of FIGS. 1 and 6. As only pipelined tree 110 of FSM architecture 100 of FIG. 7 is different than that of FIGS. 1 and 6, generally only pipelined tree 110 of FSM architecture 100 of FIG. 7 is described below for purposes of clarity and not limitation.

In this example, a linear portion of pipelined tree 110 may have merge modules 103-1 through 103-4 respectively coupled between look-ahead-cascade modules 102-1 through 102-4 and corresponding disambiguation modules 104-1 through 104-4, with look-ahead-cascade modules 102-0 and disambiguation module 104-0 coupled to one another as previously described. This linear portion spans pipelined stages 113 through 116. Furthermore, a linear portion of pipelined tree 110 may have first instances of merge modules 103-5 through 103-7 respectively coupled to look-ahead-cascade modules 102-5 through 102-7 spanning pipelined stages 113 through 115. In a binary portion of pipelined tree 110, second instances of merge modules 103-5 through 103-7 are respectively coupled to outputs of first instances of merge modules 103-5 through 103-7 for pipelined stage 116. In this example of a pipelined tree 110 there may be pipelined stages 113 through 116, namely a longer latency with fewer merge modules 103 than pipelined tree 110 of FIG. 1 but a shorter latency with more merge modules 103 than pipelined tree 110 of FIG. 6.

N states 111-0 through 111-3 may respectively be provided in pipelined stages 113 through 116 to a nearest neighbor merge module 103 one level or order higher for respective selection of rN states, and N states 111-4 through 111-6 may respectively be provided in pipelined stages 113 through 115 to a first instance nearest neighbor merge module 103 one level or order higher for respective selection of rN states. More particularly, rN states 113-1 through 113-4 are respectively input to corresponding merge modules 103-1 through 103-4 of same order for selection of rN states 117-1 through 117-4, respectively, pipelined out of pipeline tree 110. Such rN states 117-1 through 117-4 may effectively be selected responsive to N states 111-0 through 111-3, respectively, provided as selectors to merge modules 103-1 through 103-4 in pipeline stages 113 through 119, respectively. Additionally, rN states 113-5 through 113-7 are respectively input to first instances of corresponding merge modules 103-5 through 103-7 of same order in a linear portion, and rN states output from first instances of merge modules 103-5 through 103-7 are respectively provided as inputs to second instances of merge modules 103-5 through 103-7 of same order for selection of rN states 117-5 through 117-7, respectively, pipelined out of pipeline tree 110. Such rN states 117-5 through 117-7 may be selected in a binary portion of pipelined tree 110 responsive to N states 111-3 provided as selectors to each of such second instances of merge modules 103-5 through 103-7 in pipeline stage 116.

Figure 8:
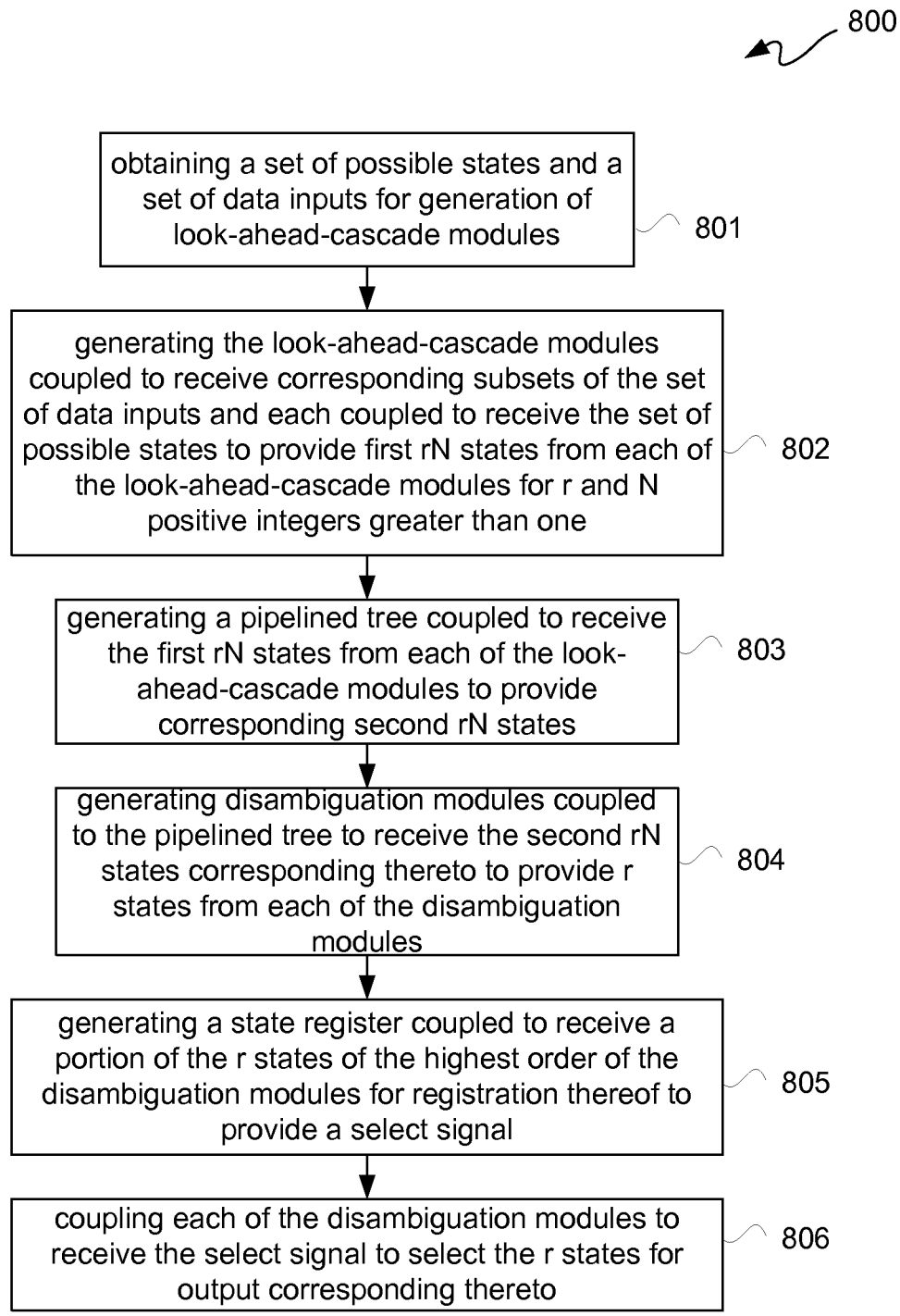
FIG. 8 is a flow diagram depicting an exemplary FSM configuration flow to provide any of the FSM architectures of FIG. 1, 6, or 7.

FIG. 8 is a flow diagram depicting an exemplary FSM configuration flow 800 to provide any of FSM architectures 100 previously described. FSM architecture 100 may be instantiated in a programmable device, such as an FPGA or other programmable device.

At 801, a set of possible states and a set of data inputs may be obtained for generation of look-ahead-cascade modules. At 802, such look-ahead modules may be generated coupled to receive corresponding subsets of the set of data inputs and each coupled to receive the set of possible states to provide first rN states from each of the look-ahead-cascade modules for r and N positive integers greater than one. Such set of possible states may include possible states $P_0$ through $P_{N-1}$. Such first rN states may be rN states 113-0 through 113-7 for example.

At 803, a pipelined tree may be generated coupled to receive the first rN states from each of the look-ahead-cascade modules to provide corresponding second rN states. Such pipelined tree may be a binary tree, a linear tree, or hybrid linear-binary tree, and thus for example such second rN states may be rN states 116-0 through 116-7, 120-0 through 120-7, or 117-0 through 117-7, respectively.

At 804, disambiguation modules may be generated coupled to the pipelined tree to receive the second rN states corresponding thereto to provide r states from each of the disambiguation modules. Each of the disambiguation modules may be coupled to provide the r states respectively therefrom from the second rN states corresponding thereto.

At 805, a state register may be generated, or instantiated, coupled to receive a portion of the r states of the highest order of the disambiguation modules for registration thereof to provide a select signal. At 806, each of the disambiguation modules may be coupled to receive the select signal to select the r states for output corresponding thereto. Such select signal may be used to select r states for output from each corresponding rN states input to such disambiguation modules generated.

FIGS. 12-1 through 12-3 is a listing diagram depicting an exemplary FSM configuration flow 1200 for FSM architecture 100 of FIG. 1. FSM configuration flow 1200 is a pseudo-code listing for instantiating an FSM architecture 100 of FIG. 1. However, other configuration flows for instantiating any of the FSM architectures 100 described herein or variations thereof with respect to a merge network follow from the description hereof.

In FIGS. 12-1 through 12-3, "D" is short for input data; "MM" is short for merge module; "DM" is short for disambiguation module; "L+C" is short for look-ahead-cascade module; "Sigma [N]" represents N possible states; and "Delta" is short for a transition function. This and other information in FSM configuration flow 1200 follows from the above description.

In FIG. 12-1, a parallelization ("par") is generated at 1202 for m outputs or results at 1203 by incrementing i for result[i] based on history[i, (int)s0)] for disambiguation modules. FIG. 12-2 lists a detailed breakout of history=doSteps (Sigma, m, D) at 1201 in FIG. 12-1. Generally, "history1" and "history2" are for partitioning of data states into different groups, and "history" is for merging history1 and history2. Along those lines, FIG. 12-2 is generally for constructing a merge network. FIG. 12-3 is generally for constructing look-ahead-cascade modules.

Figure 9:
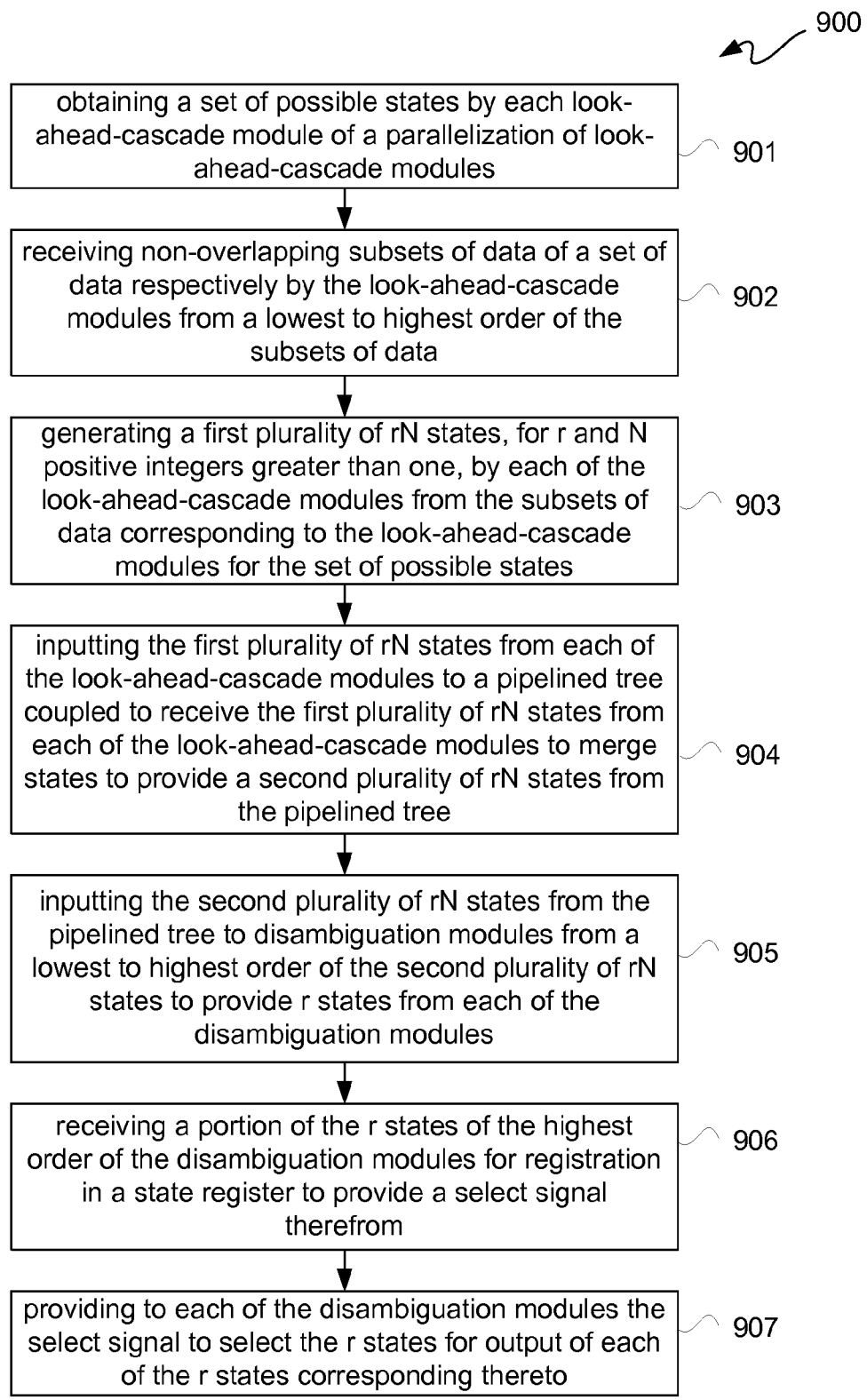
FIG. 9 is a flow diagram depicting an exemplary FSM operational flow for any of the FSM architectures of FIG. 1, 6, or 7.

FIG. 9 is a flow diagram depicting an exemplary FSM operational flow 900 for FSM architecture 100 of FIG. 1, 6, or 7. At 901, a set of possible states may be obtained by each look-ahead-cascade module of a parallelization of look-ahead-cascade modules. At 902, non-overlapping subsets of data of a set of data may be respectively received by the look-ahead-cascade modules from the lowest order to the highest order of the subsets of data. At 903, a first plurality of rN states, for r and N positive integers greater than one, may be generated by each of the look-ahead-cascade modules from the subsets of data corresponding to the look-ahead-cascade modules for the set of possible states, where the set of possible states includes possible states $P_0$ through $P_{N-1}$.

At 904, the first plurality of rN states from each of the look-ahead-cascade modules may be input to a pipelined tree coupled to receive the first plurality of rN states from each of the look-ahead-cascade modules to merge states to provide a second plurality of rN states from the pipelined tree. At 905, the second plurality of rN states from the pipelined tree may be input to disambiguation modules from the lowest order to the highest order of the second plurality of rN states to provide r states from each of the disambiguation modules. At 906, a portion of the r states of the highest order of the disambiguation modules may be received for registration in a state register to provide a select signal from the state register. At 907, each of the disambiguation modules may be provided with the select signal to select the r states for output of each of the r states corresponding to the disambiguation modules.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IoBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices.

In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 10:
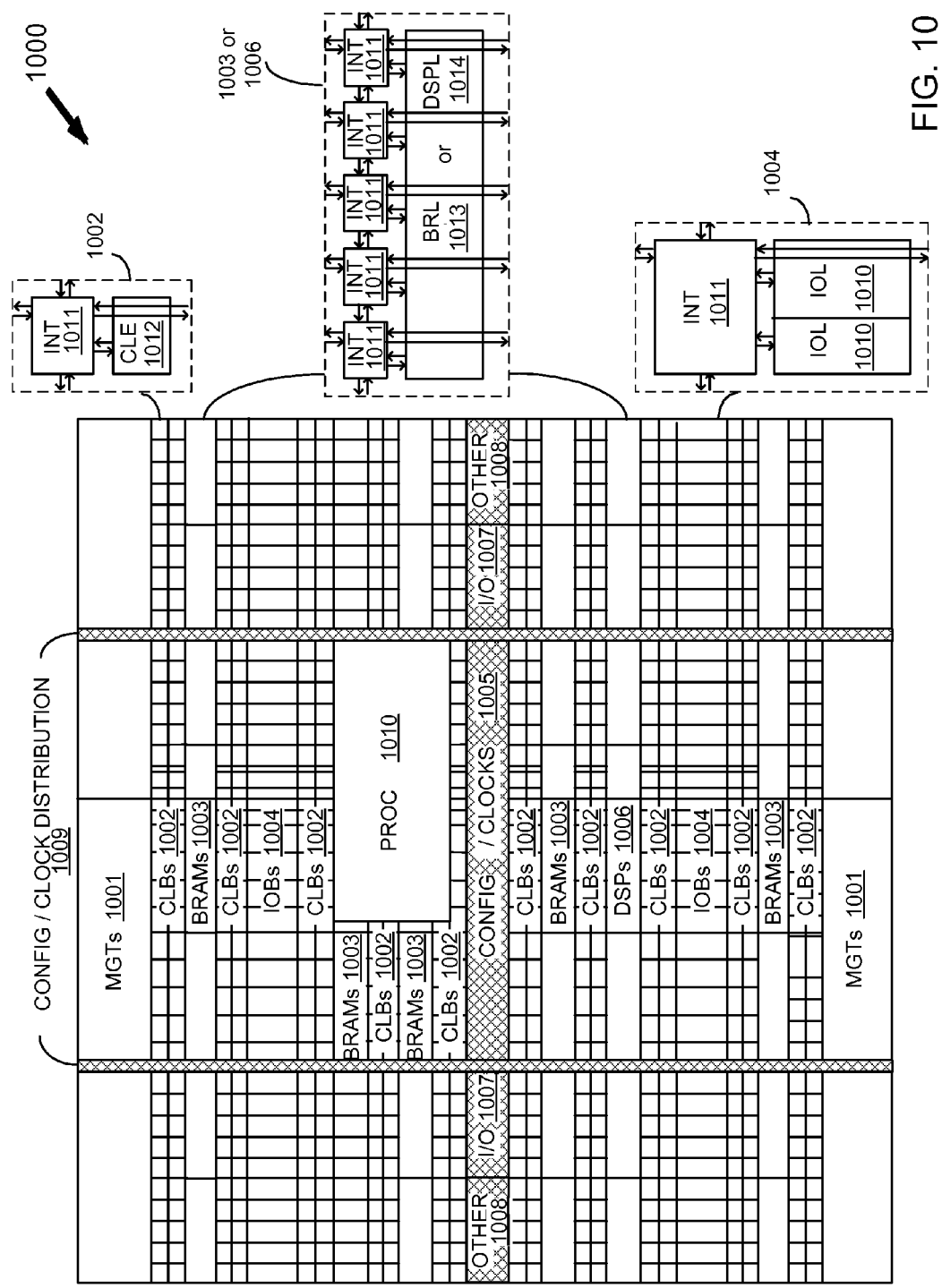
FIG. 10 is a simplified block diagram depicting an exemplary columnar Field Programmable Gate Array ("FPGA") architecture.

As noted above, advanced FPGAs can include several different types of programmable logic blocks in the array. For example, FIG. 10 illustrates an FPGA architecture 1000 that includes a large number of different programmable tiles including multi-gigabit transceivers ("MGTs") 1001, configurable logic blocks ("CLBs") 1002, random access memory blocks ("BRAMs") 1003, input/output blocks ("IOBs") 1004, configuration and clocking logic ("CONFIG/CLOCKS") 1005, digital signal processing blocks ("DSPs") 1006, specialized input/output blocks ("I/O") 1007 (e.g., configuration ports and clock ports), and other programmable logic 1008 such as digital clock managers, analog-to-digital converters, system monitoring logic, and so forth. Some FPGAs also include dedicated processor blocks ("PROC") 1010.

In some FPGAs, each programmable tile includes a programmable interconnect element ("INT") 1011 having standardized connections to and from a corresponding interconnect element in each adjacent tile. Therefore, the programmable interconnect elements taken together implement the programmable interconnect structure for the illustrated FPGA. The programmable interconnect element 1011 also includes the connections to and from the programmable logic element within the same tile, as shown by the examples included at the top of FIG. 10.

For example, a CLB 1002 can include a configurable logic element ("CLE") 1012 that can be programmed to implement user logic plus a single programmable interconnect element ("INT") 1011. A BRAM 1003 can include a BRAM logic element ("BRL") 1013 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 1006 can include a DSP logic element ("DSPL") 1014 in addition to an appropriate number of programmable interconnect elements. An IOB 1004 can include, for example, two instances of an input/output logic element ("IOL") 1015 in addition to one instance of the programmable interconnect element 1011. As will be clear to those of skill in the art, the actual I/O pads connected, for example, to the I/O logic element 1015 typically are not confined to the area of the input/output logic element 1015.

In the pictured embodiment, a horizontal area near the center of the die (shown in FIG. 10) is used for configuration, clock, and other control logic. Vertical columns 1009 extending from this horizontal area or column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic. For example, processor block 1010 spans several columns of CLBs and BRAMs.

Note that FIG. 10 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 10 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 11:
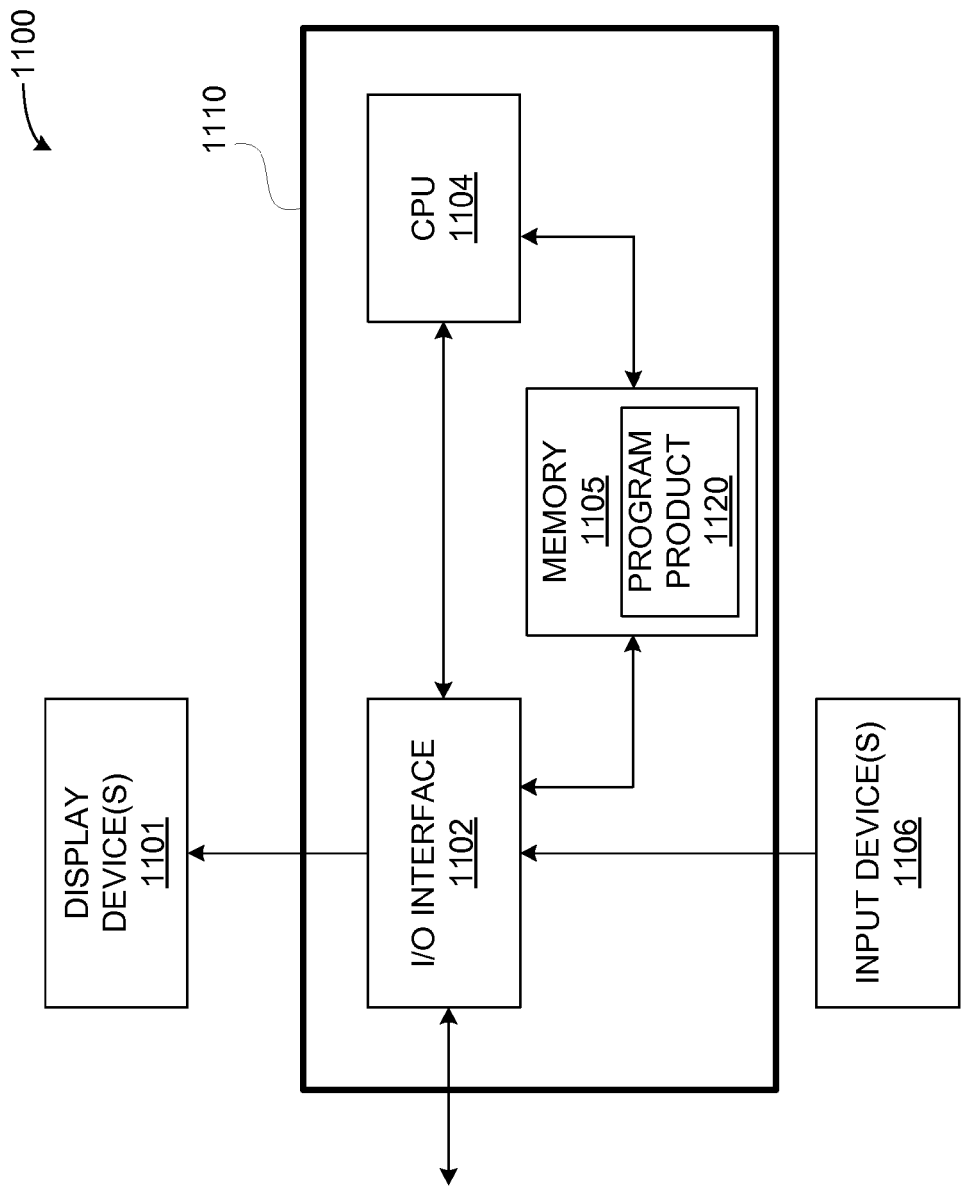
FIG. 11 is a block diagram depicting an exemplary computer system.

FIG. 11 is a block diagram depicting an exemplary computer system 1100. Computer system 1100 may include a programmed computer 1110 coupled to one or more display devices 1101, such as Cathode Ray Tube ("CRT") displays, plasma displays, Liquid Crystal Displays ("LCD"), projectors and to one or more input devices 1106, such as a keyboard and a cursor pointing device. Other known configurations of a computer system may be used. Computer system 1100 by itself or networked with one or more other computer systems 1100 may provide an information handling system.

Programmed computer 1110 may be programmed with a known operating system, which may be Mac OS, Java Virtual Machine, Real-Time OS Linux, Solaris, iOS, Android Linux-based OS, Unix, or a Windows operating system, among other known platforms. Programmed computer 1110 includes a central processing unit (CPU) 1104, memory 1105, and an input/output ("I/O") interface 1102. CPU 1104 may be a type of microprocessor known in the art, such as available from IBM, Intel, ARM, and Advanced Micro Devices for example. Support circuits (not shown) may include cache, power supplies, clock circuits, data registers, and the like. Memory 1105 may be directly coupled to CPU 1104 or coupled through I/O interface 1102. At least a portion of an operating system may be disposed in memory 1105. Memory 1105 may include one or more of the following: flash memory, random access memory, read only memory, magneto-resistive read/write memory, optical read/write memory, cache memory, magnetic read/write memory, and the like, as well as non-transitory signal-bearing media as described below.

I/O interface 1102 may include chip set chips, graphics processors, and/or daughter cards, among other known circuits. An example of a daughter card may include a network interface card ("NIC"), a display interface card, a modem card, and a Universal Serial Bus ("USB") interface card, among other known circuits. Thus, I/O interface 1102 may be coupled to a conventional keyboard, network, mouse, display printer, and interface circuitry adapted to receive and transmit data, such as data files and the like. Programmed computer 1110 may be coupled to a number of client computers, server computers, or any combination thereof via a conventional network infrastructure, such as a company's Intranet and/or the Internet, for example, allowing distributed use for interface generation.

Memory 1105 may store all or portions of one or more programs or data to implement processes in accordance with one or more embodiments hereof to provide program product 1120. Thus for example, FSM configuration flow 1200 of FIGS. 12-1 through 12-3 may be implemented as a program product 1120, which when used in a programmed computer for configuration of an FPGA may be used to generate a configuration stream for instantiating an FSM architecture 100 in an FPGA. Additionally, those skilled in the art will appreciate that one or more embodiments hereof may be implemented in hardware, software, or a combination of hardware and software. Such implementations may include a number of processors or processor cores independently executing various programs and dedicated hardware or programmable hardware.

One or more program(s) of program product 1120, as well as documents thereof, may define functions of embodiments hereof and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD). The above embodiments specifically include information downloaded from the Internet and other networks. Such non-transitory signal-bearing media, when carrying computer-readable instructions that direct functions hereof, represent embodiments hereof.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A finite state machine circuit, comprising:
   look-ahead-cascade modules coupled to receive possible states of the finite state machine circuit and coupled to receive data inputs,
   wherein the possible states include possible states $P_0$ through $P_{N-1}$ for N a positive integer greater than one, N representing a number of states in the finite state machine circuit;
   wherein the look-ahead-cascade modules are coupled to receive corresponding subsets of the data inputs;
   merge modules coupled to a second-to-the-lowest order to the highest order of the look-ahead-cascade modules;
   a second-to-the-lowest order to the highest order of disambiguation modules coupled to at least a portion of the merge modules;
   the lowest order of the disambiguation modules coupled to the lowest order of the look-ahead-cascade modules;
   wherein the lowest order to the highest order of the disambiguation modules are coupled to receive respective sets of interim states of rN states each to select respective sets of next states of r states each for r a positive integer greater than one; and
   a state register coupled to receive a portion of the highest order of the sets of next states for registration to provide a select signal;
   wherein each of the disambiguation modules is coupled to receive the select signal for selection of the sets of next states of the r states each.

2. The finite state machine circuit according to claim 1, wherein a merge module of the merge modules is coupled to:
- receive a first set of the sets of interim states from a first look-ahead-cascade module of the look-ahead-cascade modules;
- receive a portion of a second set of the sets of interim states from a second look-ahead-cascade module of the look-ahead-cascade modules;
- wherein the portion of the second set of the sets of interim states is the highest order N states of the second set of the sets of interim states; and
- select a third set of the sets of interim states from the first set of the sets of interim states with the N states.

3. The finite state machine circuit according to claim 2, further comprising data registers respectively coupled to the disambiguation modules to receive and register the sets of next states output from the disambiguation modules.

4. The finite state machine circuit according to claim 2, wherein the N states are provided as select signals to corresponding multiplexers of the merge modules.

5. The finite state machine circuit according to claim 2, wherein:
- the second look-ahead-cascade module is lower in order than the first look-ahead-cascade module; and
- the first look-ahead-cascade module and the second look-ahead-cascade module are not order-adjacent nearest neighbors.

6. The finite state machine circuit according to claim 2, wherein:
- the second look-ahead-cascade module is lower in order than the first look-ahead-cascade module; and
- the first look-ahead-cascade module and the second look-ahead-cascade module are order-adjacent nearest neighbors.

7. The finite state machine circuit according to claim 1, wherein:
- the data inputs includes data items $D_0$ through $D_{m-1}$ for m a positive integer substantially greater than 10; and
- each of the subsets includes r data items of the data items $D_0$ through $D_{m-1}$.

8. The finite state machine circuit according to claim 7, wherein the possible states are the same for all of the subsets.

9. The finite state machine circuit according to claim 8, wherein the possible states are respective constants.

10. The finite state machine circuit according to claim 1, wherein:
- the data inputs have a width W for W an integer substantially greater than 100; and
- the number of the look-ahead-cascade modules is equal to m/r which is equal to the number of the subsets.

11. The finite state machine circuit according to claim 10, wherein the subsets are non-overlapping with respect to one another.

12. The finite state machine circuit according to claim 1, wherein:
- the select signal has a size of log(N); and
- the r states respectively output from each of the disambiguation modules has a bus width of r multiplied by log(N).

13. The finite state machine circuit according to claim 1, wherein:
- the merge modules are coupled between the look-ahead-cascade modules and the disambiguation modules to provide a pipelined tree.

14. The finite state machine circuit according to claim 13, wherein the pipelined tree is a binary merger tree.

15. The finite state machine circuit according to claim 13, wherein the pipelined tree is a linear merger tree.

16. The finite state machine circuit according to claim 13, wherein the pipelined tree is a hybrid linear-binary merger tree.

17. A method for providing a finite state machine circuit, comprising:
- obtaining a set of possible states and a set of data inputs for generation of look-ahead-cascade modules,
- generating the look-ahead-cascade modules coupled to receive corresponding subsets of a set of data inputs and each coupled to receive the set of possible states to provide first rN states from each of the look-ahead-cascade modules for r and N positive integers greater than one;
- wherein the set of possible states includes possible states $P_0$ through $P_{N-1}$;
- generating a pipelined tree coupled to receive the first rN states from each of the look-ahead-cascade modules to provide corresponding second rN states;
- generating disambiguation modules coupled to the pipelined tree to receive the second rN states corresponding thereto to provide r states from each of the disambiguation modules;
- wherein each of the disambiguation modules is coupled to provide the r states therefrom from the second rN states corresponding thereto;
- generating a state register coupled to receive a portion of the r states of the highest order of the disambiguation modules for registration thereof to provide a select signal; and
- coupling each of the disambiguation modules to receive the select signal to select the r states for output corresponding thereto.

18. The method according to claim 17, wherein the pipelined tree is a binary tree, a linear tree, or a hybrid linear-binary tree.

19. A method for operating a finite state machine circuit, comprising:
- obtaining a set of possible states by each look-ahead-cascade module of a parallelization of look-ahead-cascade modules,
- receiving non-overlapping subsets of data of a set of data respectively by the look-ahead-cascade modules from the lowest order to the highest order of the subsets of data;
- generating a first plurality of rN states, for r and N positive integers greater than one, by each of the look-ahead-cascade modules from the subsets of data corresponding to the look-ahead-cascade modules for the set of possible states;
- wherein the set of possible states includes possible states $P_0$ through $P_{N-1}$;
- inputting the first plurality of rN states from each of the look-ahead-cascade modules to a pipelined tree coupled to receive the first plurality of rN states from each of the look-ahead-cascade modules to merge states to provide a second plurality of rN states from the pipelined tree;
- inputting the second plurality of rN states from the pipelined tree to disambiguation modules from the lowest order to the highest order of the second plurality of rN states to provide r states from each of the disambiguation modules;
- receiving a portion of the r states of the highest order of the disambiguation modules for registration in a state register to provide a select signal therefrom; and
- providing to each of the disambiguation modules the select signal to select the r states for output of each of the r states corresponding thereto.

20. The method according to claim 19, wherein the pipelined tree is a binary tree, a linear tree, or a hybrid linear-binary tree.

* * * * *